United States Patent
Chun et al.

(10) Patent No.: US 8,495,446 B2
(45) Date of Patent: Jul. 23, 2013

(54) METHOD FOR TRANSMITTING AND RECEIVING DATA ACCORDING TO HARQ PROCESS AND MOBILE COMMUNICATION TERMINAL THEREOF

(75) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 371 days.

(21) Appl. No.: 12/448,860

(22) PCT Filed: Jan. 9, 2008

(86) PCT No.: PCT/KR2008/000142
§ 371 (c)(1),
(2), (4) Date: Jul. 10, 2009

(87) PCT Pub. No.: WO2008/084989
PCT Pub. Date: Jul. 17, 2008

(65) Prior Publication Data
US 2010/0050036 A1 Feb. 25, 2010

Related U.S. Application Data

(60) Provisional application No. 60/884,583, filed on Jan. 11, 2007.

(30) Foreign Application Priority Data

Mar. 21, 2007 (KR) .......................... 10-2007-0027585

(51) Int. Cl.
*G06F 11/00* (2006.01)
(52) U.S. Cl.
USPC ........................................... 714/748

(58) Field of Classification Search
USPC ........................................... 714/748
See application file for complete search history.

(56) References Cited

U.S. PATENT DOCUMENTS

2002/0071407 A1* 6/2002 Koo et al. .................... 370/335
2003/0123470 A1 7/2003 Kim et al.
(Continued)

FOREIGN PATENT DOCUMENTS

| CN | 1490972 A | 4/2004 |
|----|-----------|--------|
| CN | 1630227 A | 6/2005 |
| EP | 1 833 208 | 9/2007 |
| EP | 1 871 032 | 12/2007 |
| JP | 2005-536160 | 11/2005 |
| TW | 576054 B | 2/2004 |
| WO | WO 2006/103618 | 10/2005 |

OTHER PUBLICATIONS

Lucent Technologies: "Text Proposal: EDCH Impact on L2/L3", 3GPP Draft; R2-40552, 3GPP, Mobile Competence Centre; 650, Toute Des Lucioles; F-06921 Sophia-Anti Polis Cedex; France, vol. RAN WG2, no. Malaga, Spain; Feb. 13, 2004, XP050125658.

*Primary Examiner* — Scott Baderman
*Assistant Examiner* — Jigar Patel
(74) *Attorney, Agent, or Firm* — McKenna, Long & Aldridge, LLP.

(57) ABSTRACT

Disclosed herein is transmission/reception of data according to a hybrid automatic repeat request (HARQ) process. A method for transmitting data includes, at a transmission side, mapping at least one HARQ process to at least one logical channel, and transmitting a control signal including information associated with the mapping result to a reception side. Accordingly, it is possible to efficiently use a radio resource and reduce unnecessary overhead.

10 Claims, 7 Drawing Sheets

U.S. PATENT DOCUMENTS

| | | |
|---|---|---|
| 2004/0233887 A1 | 11/2004 | Meiling et al. |
| 2004/0266466 A1* | 12/2004 | Kim et al. ............ 455/509 |
| 2005/0251722 A1 | 11/2005 | Terry et al. |
| 2006/0003784 A1* | 1/2006 | Chion et al. .......... 455/518 |
| 2007/0070926 A1* | 3/2007 | Bachl et al. .......... 370/310 |
| 2008/0043619 A1* | 2/2008 | Sammour et al. ......... 370/231 |
| 2008/0123660 A1* | 5/2008 | Sammour et al. ...... 370/395.21 |
| 2008/0153535 A1* | 6/2008 | Gorokhov et al. ........ 455/522 |
| 2009/0150739 A1* | 6/2009 | Park et al. ............ 714/749 |

\* cited by examiner

| maximum number of retransmission | 8 |
| --- | --- |
| RV | XX... |
| retransmission cycle | 5 ms |
| scheduling method | A, B, C |

| Traffic type | Logical channel | HARQ process | Scheduling method |
| --- | --- | --- | --- |
| RT Traffic | 0, 1 | 0, 1 | Scheduling method B |
| NRT Traffic | 2, 3 | 2, 3, 4, 5 | Scheduling method A |

| Provided scheduling method | A, B, C, D |
|---|---|
| DL scheduling information format | XX |

METHOD FOR TRANSMITTING AND RECEIVING DATA ACCORDING TO HARQ PROCESS AND MOBILE COMMUNICATION TERMINAL THEREOF

This application is a national phase entry of International Application No. PCT/KR2008/000142, filed Jan. 9, 2008 and claims priority to Korean Patent Application No. 10-2007-0027585 filed Mar. 21, 2007 and U.S. Provisional Application No. 60/884, 583 filed Jan. 11, 2007, all of which are hereby incorporated by reference in their entireties.

TECHNICAL FIELD

The present invention relates to a hybrid automatic repeat request (HARQ) process, and more particularly, to a method for transmitting/receiving data, which is capable of improving efficiency of a radio resource by omitting an identifier of a logical channel included in a media access control (MAC) header and information indicating a HARQ operation, and a transmitting/receiving apparatus for supporting the same.

BACKGROUND ART

In a long term evolution (LTE) system which has been spotlighted as the next-generation mobile communication standard, various scheduling methods which assign radio resources for transmitting/receiving data and configure various types of transmission parameters have been suggested. Among them, four representative scheduling methods are as follows.

First, a dynamic scheduling method basically requires downlink (DL) scheduling information or uplink (UL) scheduling information for each data transmitted in a transmission time interval (TTI).

If a terminal and a base station are operated by an asynchronous HARQ method in order to transmit or receive data, in the dynamic scheduling method, the DL assignment or the UL scheduling information is required at the time of initial transmission or retransmission of data. In contrast, if the terminal and the base station are operated by a synchronous HARQ method, the DL assignment or the UL scheduling information is required for each data at the time of the initial transmission of the data, but is not required at the time of the retransmission of the data. At this time, the DL assignment or the UL scheduling information in the dynamic scheduling method is available in a single terminal.

Second, in a persistent scheduling method, the DL assignment or the UL scheduling information is not transmitted in the TTI unlike the dynamic scheduling method, and the base station statically informs a terminal of a data transmitting/receiving method through a radio resource control (RRC) signal in advance, similar to the configuration of a radio bearer. Accordingly, the terminal uses predetermined information through the RRC signal at the time of the transmission/reception of the data, without the DL assignment or the UL scheduling information.

For example, when the base station configures a radio resource A, in which downlink data with a transmission format B is received in a cycle C, in the terminal through the RRC signal in advance, the terminal can receive the data using the values A, B and C, without the DL assignment. Similarly, even when the terminal transmits data to the base station, the data can be transmitted according to the information without separate UL scheduling information.

Third, a grouping scheduling method is similar to the dynamic scheduling method. However, while the dynamic scheduling method is available in a single terminal, the grouping scheduling method is available in a plurality of terminals.

For example, if first to tenth terminals are included in a group A and first, second and third terminals request DL assignment, the base station includes a group identifier A, identifiers of the first, second and third terminals and the DL assignment of the terminals in group DL assignment and transmits the group DL assignment.

Fourth, a synchronous HARQ retransmission or semi-static scheduling method is used when the terminal and the base station transmit/receive data by an asynchronous HARQ method. In this method, the terminal and the bas station are operated by the asynchronous HARQ method at the time of initial transmission of data and are operated by the synchronous HARQ method at the time of retransmission of data.

For example, in a case where the HARQ transmission method is configured in the terminal, the terminal and the base station are operated by the synchronous HARQ method when the retransmission is performed, although the asynchronous HARQ information is included in the DL assignment. That is, the information such as a retransmission cycle is previously configured in the terminal through the RRC signal and the retransmission is performed using the configuration information and the DL assignment acquired at the time of the initial reception of data.

DISCLOSURE OF INVENTION

Technical Problem

However, if the dynamic scheduling method is always used in the transmission/reception of the data, the base station should transmit the DL assignment through a PDCCH, for example, a physical downlink control channel (PDCCH), whenever the data is transmitted through a DL-SCH, regardless of the initial transmission or the retransmission. Accordingly, unnecessary overhead occurs in the restricted capacity of the PDCCH.

In addition, in order to indicate a special HARQ operation such as a HARQ soft combining operation without a HARQ feedback, additional information is required and the radio resource is wasted.

Technical Solution

Accordingly, the present invention is directed to a method for transmitting and receiving data according to a HARQ process and a mobile communication terminal thereof that substantially obviate one or more problems due to limitations and disadvantages of the related art.

An object of the present invention devised to solve the problem lies on a method for transmitting data, which is capable of reducing unnecessary overhead in data transmission and efficiently using a radio resource.

Another object of the present invention devised to solve the problem lies on a mobile communication terminal of a reception side using the method for transmitting the data.

The object of the present invention can be achieved by providing a method for transmitting data according to a hybrid automatic repeat request (HARQ) process in a mobile communication system, the method including: at a transmission side, mapping at least one HARQ process to at least one logical channel; and transmitting a control signal including information associated with the mapping result to a reception side.

Preferably, the logical channel may include at least one of a broadcast control channel (BCCH), a paging control channel (PCCH), a MBMS control channel (MCCH) or a MBMS traffic channel (MTCH). In this case, the mapping may include mapping a dedicated broadcast HARQ process to any one of the BCCH, the PCCH, the MCCH or the MTCH.

Preferably, the mapping may include mapping at least one HARQ process identifier to the at least one logical channel.

Preferably, the mapping may include informing the reception side of a scheduling method corresponding to the type of the logical channel in advance.

Preferably, the control signal may be any one of a physical downlink control channel (PDCCH) signal, a media access control (MAC) signal, and a radio resource control (RRC) signal.

Preferably, the method may further include transmitting the data to the reception side by the HARQ process according to the mapping result.

In another aspect of the present invention, provided herein is a method for transmitting data according to a HARQ process in a mobile communication system, the method including: at a transmission side, mapping at least one HARQ process to at least one logical channel; and transmitting the data to a reception side by the HARQ process according to the mapping result.

Preferably, the logical channel may include at least one of a broadcast control channel (BCCH), a paging control channel (PCCH), a MBMS control channel (MCCH) or a MBMS traffic channel (MTCH). In this case, the mapping may include mapping a dedicated HARQ process to any one of the BCCH, the PCCH, the MCCH or the MTCH. For example, BCCH may be mapped to a dedicated broadcast HARQ process.

Preferably, the mapping may include informing the reception side of a scheduling method corresponding to the type of the logical channel in advance.

In yet another aspect of the present invention, provided herein is a method for transmitting data according to a HARQ process in a mobile communication system, the method including: reading a result of mapping the HARQ process to a logical channel stored in a transmission side as an initial value; and transmitting the data to a reception side by the HARQ process according to the mapping result.

Preferably, the logical channel may include at least one of a broadcast control channel (BCCH), a paging control channel (PCCH), a MBMS control channel (MCCH) or a MBMS traffic channel (MTCH).

Preferably, the mapping result may be obtained by mapping at least one HARQ process to at least one logical channel.

In yet another aspect of the present invention, provided herein is a mobile communication terminal which receives data according to a HARQ process in a mobile communication system, the mobile communication terminal including: a wireless communication unit which receives a control signal from a transmission side; and a control unit which determines a HARQ process operation for receiving the data of the transmission side according to a result of mapping the HARQ process to a logical channel included in the control signal.

Preferably, the logical channel may include at least one of a broadcast control channel (BCCH), a paging control channel (PCCH), a MBMS control channel (MCCH) or a MBMS traffic channel (MTCH).

Preferably, the mapping result may be obtained by mapping at least one HARQ process to at least one logical channel.

In yet another aspect of the present invention, provided herein is a mobile communication terminal which receives data according to a HARQ process in a mobile communication system, the mobile communication terminal including: a memory unit which stores a mapping result between the HARQ process and a logical channel; and a control unit which reads the mapping result stored in the memory unit as an initial value and determines a HARQ process operation for receiving the data of the transmission side according to the mapping result.

Preferably, the logical channel may include at least one of a broadcast control channel (BCCH), a paging control channel (PCCH), a MBMS control channel (MCCH) or a MBMS traffic channel (MTCH).

Preferably, the mapping result may be obtained by mapping at least one HARQ process to at least one logical channel.

Advantageous Effects

According to embodiments of the present invention, since data is transmitted/received according to a result of mapping a HARQ process to a logical channel, additional information indicating a special HARQ operation without a HARQ feedback or an operation using a HARQ process which varies according to the logical channel is not required and a logical channel identifier which is included in a MAC header in order to map the transmission channel to the logical channel can be omitted. Accordingly, it is possible to reduce unnecessary overhead and efficiently use a radio resource.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
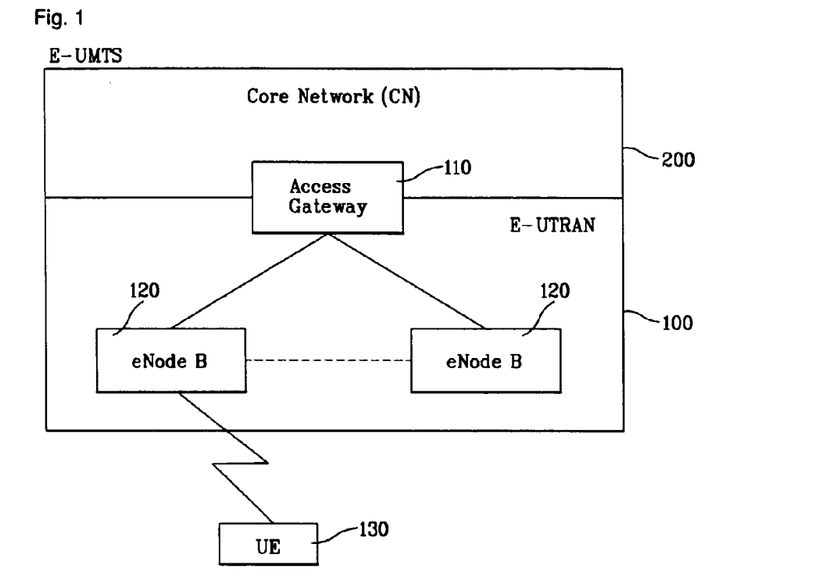
FIG. 1 is a view showing the network structure of an evolved universal mobile telecommunications system (E-UMTS)

FIG. 1 is a view showing the network structure of an evolved universal mobile telecommunications system (E-UMTS) as a mobile communication system according to the present invention.

The E-UMTS evolves from the existing UMTS and is also called a long term evolution (LTE) system. Currently, the basic standardization of the E-UMTS is ongoing in the $3^{rd}$ generation partnership project (3GPP).

The E-UMTS may be divided into an E-UTRAN 100 and a core network (CN) 200.

The E-UTRAN 100 includes an access gateway (hereinafter, referred to as an AG) 110 which is located at an end of a network and is connected to an external network, a base station (hereinafter, referred to as an eNode-B) 120 and a user equipment (UE) (hereinafter, referred to as an UE) 130. The AG 110 may be divided into a portion for processing a user traffic and a portion for processing a control traffic. In this case, the AG for processing the user traffic and the AG for processing the control traffic can communicate with each other by the use of a new interface. At least one cell may exist in one eNode-B 120 and an interface for transmitting the user traffic or the control traffic may be used between eNode-Bs.

The CN 200 may include the AG 110 and a node for registering the other UE 130. An interface for distinguishing the E-UTRAN 100 and the CN 200 from each other may be used.

Layers of a radio interface protocol between the UE 130 and the network may be classified into an L1 layer (first layer), an L2 layer (second layer), and an L3 layer (third layer) on the basis of three low-level layers of an open system interconnection (OSI) model widely known in the communication systems. Among them, a physical layer belonging to the first layer provides an information transfer service using a physical channel, and a radio resource control (hereinafter, referred to as RRC) layer located in the third layer serves to control radio resources between the UE 130 and the network. The RRC layer interchanges an RRC message between the UE 130 and the network. The RRC layer may be distributed into the eNode-B 120 and network nodes such as the AG 110 or may be located locally in the eNode-B 120 or the AG 110.

A channel status of the UE 130 or a service provided to the UE 130 may vary as occasion demands. It is preferable that a scheduling method for assigning radio resources and configuring various types of transmission parameters adaptively varies according to a variation in communication status.

Accordingly, when the communication status of the UE 130 varies, the network may transmit a predetermined control signal to the UE 130 and instruct the UE to change the scheduling method to a scheduling method suitable for the communication status.

The network checks the communication status such as the channel status of the UE or the type of the service provided to the UE, determines a scheduling method corresponding to the checked communication status, and transmits a control signal for informing the UE of the determined scheduling method to the UE.

At this time, a dynamic scheduling method, a persistent scheduling method, a grouping scheduling method and a synchronous HARQ retransmission method may be used as the scheduling method.

The network may use a radio resource interface such as a medium access control (hereinafter, referred to as MAC) layer or a RRC layer, in order to transmit the control signal to the UE 130. A physical downlink control signal, a MAC signal and a RRC signal may be used as the control signal. In particular, the physical downlink control signal may be DL assignment or UL scheduling information. Now, this will be described in detail.

Figure 2:
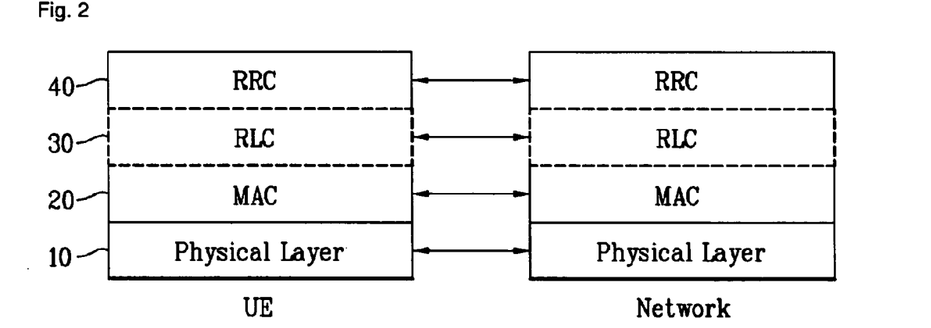
FIGS. 2 and 3 are views showing the structure of a radio interface protocol between a user equipment (UE) and a UMTS terrestrial radio access network (UTRAN) based on the 3GPP radio access network standard.
Figure 3:
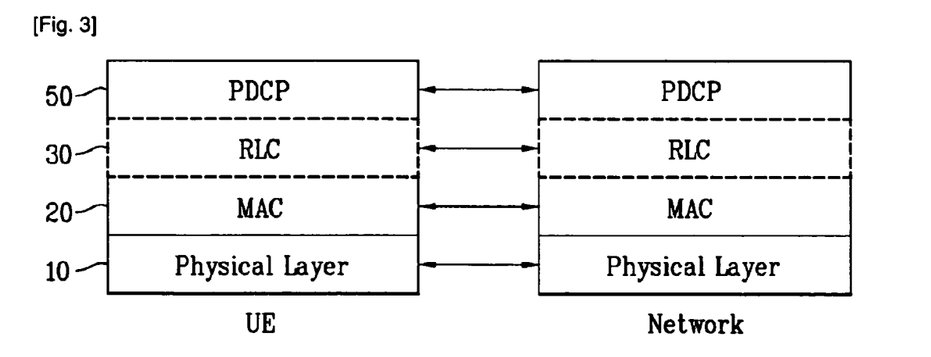

FIGS. 2 and 3 are views showing the structure of a radio interface protocol between an UE and an UTRAN based on the 3GPP radio access network standard.

The radio interface protocol between the UE and the UTRAN horizontally includes a physical layer, a data link layer, and a network layer. The radio interface protocol vertically includes a control plane for transmitting a control signal (FIG. 2) and a user plane for transmitting data and information (FIG. 3). The protocol layers of FIGS. 2 and 3 may be divided into an L1 layer (first layer), an L2 layer (second layer), and an L3 layer (third layer) on the basis of three low-level layers of an open system interconnection (OSI) model widely known in the communication systems.

Now, the radio protocol control plane of FIG. 2 and the radio protocol user plane of FIG. 3 are described in detail.

The physical layer 10 as the first layer provides an information transfer service to a high-level layer by the use of a physical channel. The physical layer 10 is connected to a MAC layer 20 as a higher-level layer through a transport channel. Data are transmitted between the MAC layer 20 and the physical layer 10 through the transport channel. Data are transmitted between different physical layers, that is, between a transmission-side physical layer and a reception-side physical layer, through a physical channel.

The MAC layer 20 of the second layer provides a service to a Radio Link Control (RLC) layer as a higher-level layer through a logical channel. The RLC layer 30 of the second layer supports the data transmission with reliability. The function of the RLC layer 30 may be embodied by a functional block in the MAC layer and, in this case, the RLC layer may not exist. A packet data convergence protocol (PDCP) layer 50 of the second layer performs a header compression function for reducing a header size of an IP packet containing unnecessary control information with a relatively large size in order to efficiently transmit packets in a radio interval having a small bandwidth at the time of transmitting an IP (Internet Protocol) packet such as IPv4 or IPv6.

The RRC layer 40 located at the lowermost of the third layer is defined in only the control plane. The RRC layer controls the logical channel, the transport channel, and the physical channel associated with the configuration, re-configuration and release of the radio bearers (RB). The RB means a service provided from the second layer so as to transmit data between the UE and the E-UTRAN.

A downlink transport channel for transmitting data from the network to the UE can include a broadcast channel (BCH) for transmitting system information and a downlink shared channel (SCH) for transmitting a user traffic or a control message. The traffic or the control message of the downlink multicast or the broadcast service may be transmitted through the downlink SCH or through a particular downlink multicast channel (MCH).

Here, for transmitting data on DL-SCH, transmitting control information of PDCCH may be required. The control information of the PDCCH is called DL assignment.

The DL assignment may include control information such as identifier information such as a group identifier and/or an UE identifier, radio resource assignment information for assigning a radio resource such as a time/frequency, duration assignment information for specifying a valid duration of the assigned radio resource, multiple antenna information including information on a multiple transmission/reception antenna (MIMO) or a beamforming method, and modulation information, the size of a payload, asynchronous HARQ information and synchronous HARQ information. The asynchronous HARQ information includes a HARQ process number, a redundancy version (RV) and a new data indicator, and the synchronous HARQ information includes retransmission sequence number.

An uplink transport channel for transmitting data from the UE to the network can include a random access channel (RACH) for transmitting an initial control message and an uplink shared channel (SCH) for transmitting a user traffic or a control message.

Here, for transmitting data on DL-SCH, transmitting control information of PDCCH may be required. The control information of the PDCCH is called UL scheduling information. The UL scheduling information may include identifier information, radio resource assignment information, duration assignment information, multiple antenna information, modulation information, and a transmission parameter such as the size of a payload.

Hereinafter, various methods of allowing the network to inform the UE of a specific scheduling method through a predetermined control signal will be described in detail.

Although it is assumed that the network is a data transmission side and the UE is a data reception side in the following description, the technical spirit of the present invention is not limited to thereto.

Figure 4:
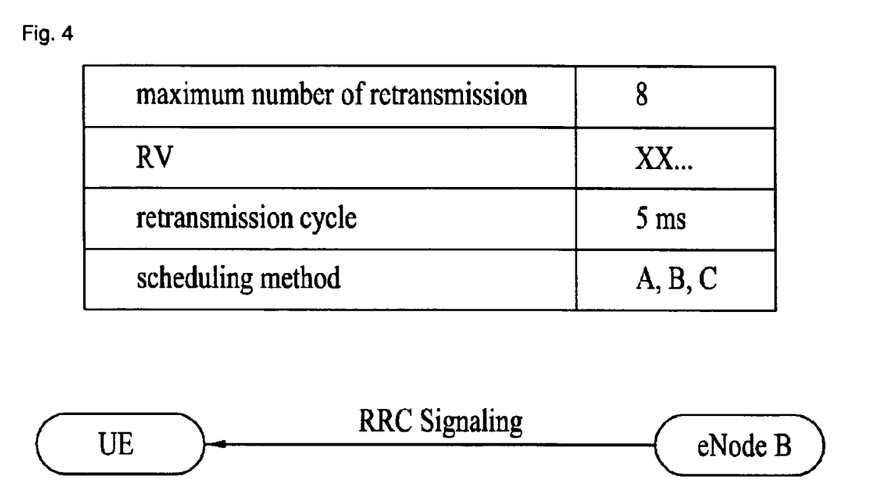
FIG. 4 is a view showing a process of transmitting first preceding information.

In the below-described embodiments, the network can previously transmit a variety of information (first preceding information) necessary for applying a suitable scheduling method according to the communication status to the UE. The first preceding information may include the maximum number of retransmission, the redundancy version (RV), a retransmission cycle, and the type of a variable scheduling method and may be, for example, transmitted through a RRC signal. FIG. 4 is a view showing a process of transmitting the first preceding information.

The present invention is not limited thereto and the above-described information may be previously configured as initial values between both the network and the UE without a separate RRC signal.

The method for transmitting data according to an embodiment of the present invention suggests a method of determining the scheduling method informed from the network using a result of mapping a HARQ process to a logical channel.

The network checks the communication status such as the channel status of the UE or the type of the service provided to the UE and determines the scheduling method corresponding to the checked communication status. Now, a service provided to the UE as the communication status which is a reference for determining the scheduling method will be described.

The network distinguishes at least one logical channel according to the type of the provided service and maps a HARQ process, for example, a HARQ process identifier, to the logical distinguished channel. Thereafter, the network transmits a control signal associated with the mapping result of the HARQ process to the UE. Examples of the logical channel to which the HARQ process maps include a broadcast control channel (BCCH), a paging control channel (PCCH), a MBMS control channel (MCCH) and a MBMS traffic channel (MTCH).

Figure 5:
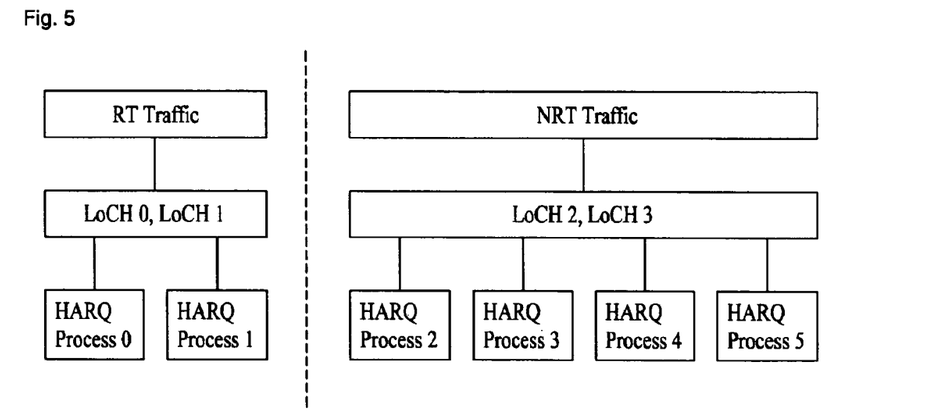
FIG. 5 is a view showing a process of distinguishing logical channels from each other according to the type of a service in an embodiment of the present invention.

For example, the service provided to the UE may be divided into a real time traffic (RT traffic) service and a non-real time traffic (NRT traffic) service. It is assumed that logical channels 0 to 3 exist and HARQ processes 0 to 5 exist. It is assumed that the logical channels 0 and 1 are used for transmitting the RT traffic and the logical channels 2 and 3 are used for transmitting the NRT traffic.

When the network maps the HARQ processes 0 and 1 to the logical channels 0 and 1 and maps the HARQ processes 2 to 5 to the logical channels 2 and 3, the HARQ processes 0 and 1 are used for transmitting the RT traffic and the HARQ processes 2 to 5 are used for transmitting the NRT traffic. FIG. 5 is a view showing a process of distinguishing logical channels from each other according to the type of the service.

Figure 6:
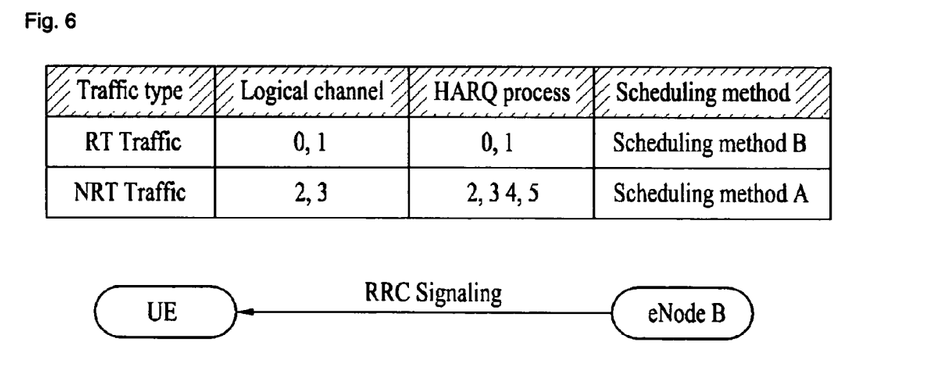
FIG. 6 is a view showing a process of transmitting second preceding information according to an embodiment of the present invention.

The network can transmit information on the type of the provided service, the distinction of the logical channel and the result of mapping the HARQ process to the distinguished logical channel and second preceding information including the scheduling method for the HARQ process to the UE. At this time, the second preceding information may be transmitted through the RRC signal. FIG. 6 is a view showing a process of transmitting the second preceding information.

The UE receives the second preceding information from the network and checks the DL assignment transmitted through the PDCCH in order to receive downlink data. The DL assignment includes a HARQ process identifier. Accordingly, the UE checks that the HARQ process identifier 0 or 1 is included in the DL assignment and determines that the data is received by the scheduling method B (for example, the synchronous HARQ retransmission method). Now, the synchronous HARQ retransmission method will be described in detail.

The UE receives the DL assignment transmitted through the PDCCH and receives data transmitted through the DL-SCH according to the received DL assignment, in order to receive specific data which is not retransmitted and is initially transmitted. If the UE does not receive normally the data, the UE transmits a not-acknowledgement (NACK) to the network and the network retransmits the data according to the status information.

At the time of the retransmission of the data, the network transmits the data using a transmission type and the information of the radio resource used for the initial transmission and performs the retransmission in synchronization with a specific time interval which is previously determined by an appointment with the UE. The time interval may be previously determined between the network and the UE through the RRC signal as shown in FIG. 4.

Figure 7:
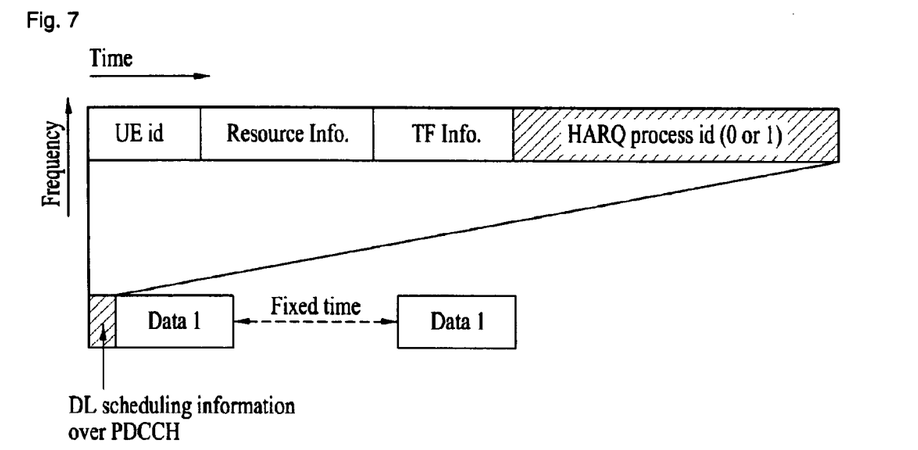
FIG. 7 is a view showing a state in which initial transmission and retransmission are performed according to a synchronous HARQ retransmission method.

FIG. 7 is a view showing a state in which the initial transmission and retransmission are performed according to the synchronous HARQ retransmission method. That is, unlike the initial transmission of the data, at the time of the retransmission, the UE receives retransmission data including no the DL assignment transmitted through the PDCCH. Accordingly, in order to receive the retransmission data, associated parameter information is used through the DL assignment acquired at the time of the initial transmission and the first preceding information and/or second preceding information which are previously acquired through the RRC signal.

Figure 8:
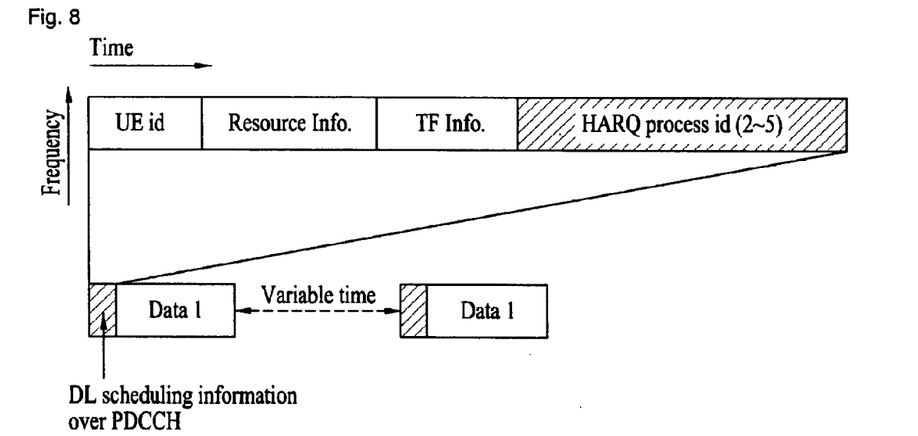
FIG. 8 is a view showing a state in which initial transmission and retransmission are performed according to a dynamic scheduling method.

If any one of the HARQ processes 2 to 5 is used, the UE performs the retransmission using separate DL assignment included in the retransmission data. FIG. 8 is a view showing a state in which the initial transmission and retransmission are performed according to the dynamic scheduling method.

Preferably, the UE can determine the scheduling method using an UE identifier.

In this case, the network checks the communication status such as the channel status of the UE or the type of the service provided to the UE and determines the scheduling method corresponding to the checked communication status.

If it is assumed that the UE has a plurality of UE identifiers, the network transmits the second preceding information including the respective scheduling methods for the UE identifiers to the UE. At this time, the second preceding information may be transmitted through the RRC signal.

Figure 9:
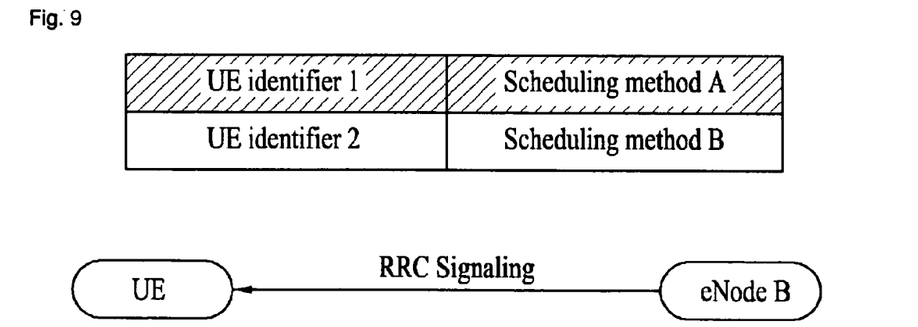
FIG. 9 is a view showing a process of transmitting second preceding information including respective scheduling methods for terminal identifiers.

FIG. 9 is a view showing a process of transmitting the second preceding information including the respective scheduling methods for the UE identifiers.

Figure 10:
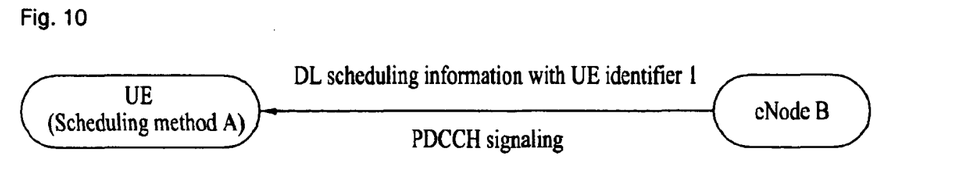
FIGS. 10 and 11 are views showing a process of determining a scheduling method according to the second preceding information of FIG. 9.
Figure 11:
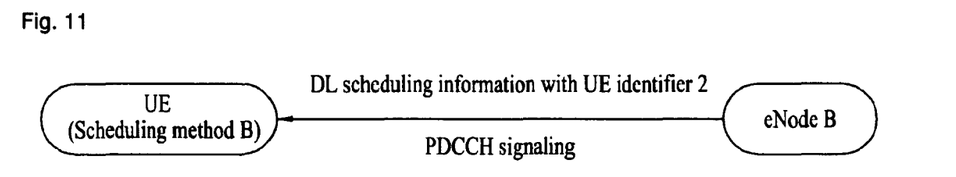

The UE receives the second preceding information from the network and checks the DL assignment transmitted through the PDCCH in order to receive the downlink data. In the example shown in FIG. 9, if the DL assignment is transmitted using the UE identifier 1, the UE determines that the data is received by the scheduling method A and, if the DL assignment is transmitted using the UE identifier 2, the UE determines that the data is received by the scheduling method B. The process of determining the scheduling method is shown in FIGS. 10 and 11.

Preferably, the network may add a specific field for specifying the scheduling method to the DL assignment.

In this case, the network checks the communication status such as the channel status of the UE or the type of the service provided to the UE and determines the scheduling method corresponding to the checked communication status. The determined scheduling method is specified in the additional field of the DL assignment.

At this time, if the number of the scheduling methods supported by the communication system is two or less, one bit is sufficient as the additional field, but, if the number of the scheduling methods supported by the communication system is two or more, the bit number of the additional field can be increased so as to sufficiently specify the types of the scheduling methods.

The network transmits format information of the DL assignment having the specific field added thereto and the second preceding information including the provided scheduling method to the UE. At this time, the second preceding information may be transmitted through the RRC signal.

Figure 12:
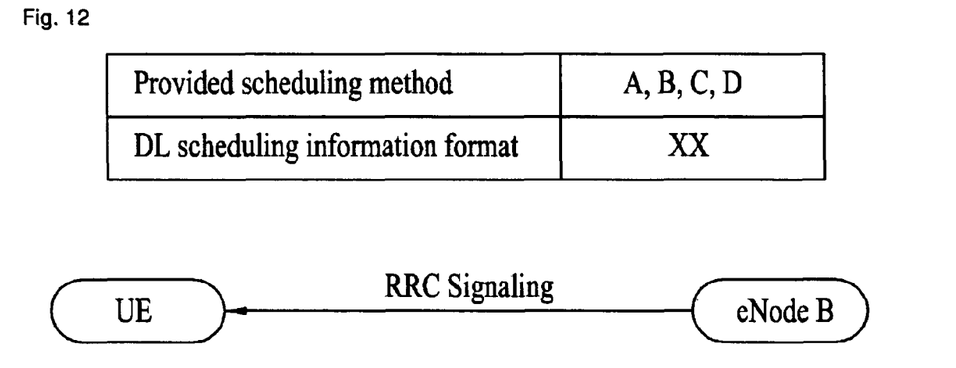
FIG. 12 is a view showing a process of transmitting second preceding information including an additional field.

FIG. 12 is a view showing a process of transmitting the second preceding information including the additional field.

The UE receives the second preceding information from the network, checks the changed format of the DL assignment, and checks the DL assignment transmitted through the PDCCH in order to receive the downlink data.

Figure 13:
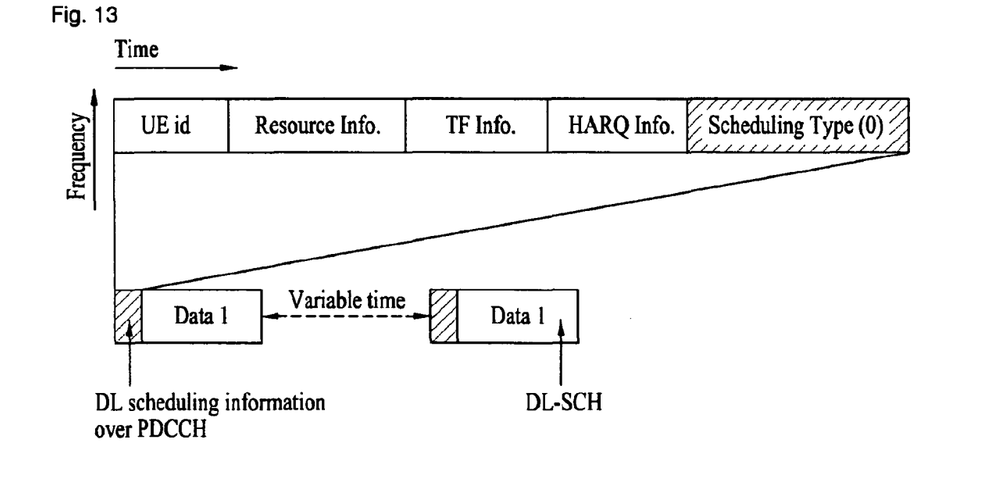
FIGS. 13 and 14 are views showing a process of determining a scheduling method according to the second preceding information of FIG. 12.
Figure 14:
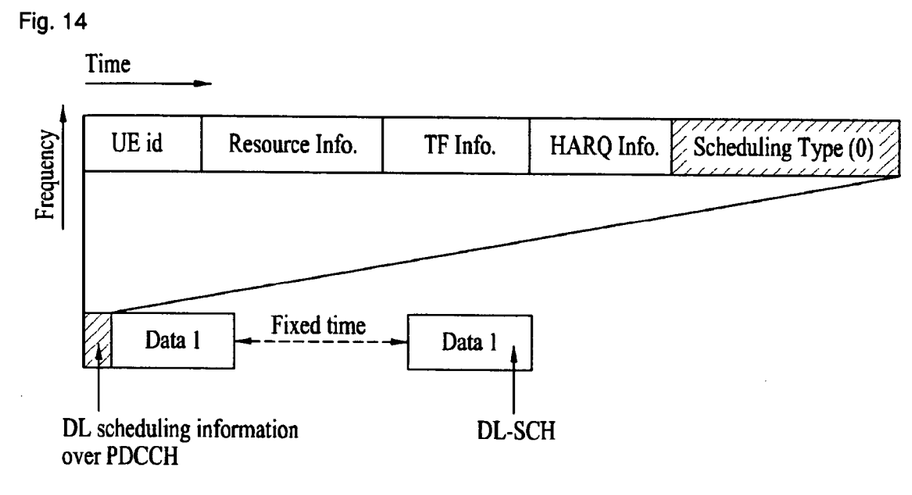

For example, it is assumed that the additional field is composed of one bit, 0 is mapped to the dynamic scheduling method and 1 is mapped to the synchronous HARQ retransmission method. At this time, if the additional field of the received DL assignment is 0, the UE determines that the data is received by the dynamic scheduling method and, if the additional field of the received DL assignment is 1, the UE determines that the data is received by the synchronous HARQ retransmission method. The process of determining the scheduling method is shown in FIGS. 13 and 14.

Preferably, the network may add a specific field for specifying the scheduling method to the DL assignment transmitted to the UEs of a group.

In this case, the network checks the communication status such as the channel status of the UE or the type of the service provided to the UE and determines the scheduling method corresponding to the checked communication status.

The network simultaneously transmits the DL assignment to specific UEs belonging to the group in order to reduce the information amount of the physical downlink control signal. This scheduling method is the grouping scheduling method and the scheduling information is group DL assignment. The grouping scheduling method will be described in detail with reference to FIG. 15.

For example, if three UEs, for example, UE1, UE2 and UE3, exist in a specific group, the group DL assignment may include one group identifier, identifiers of the UEs, scheduling information of the UEs, and the scheduling methods of the UEs.

Figure 15:
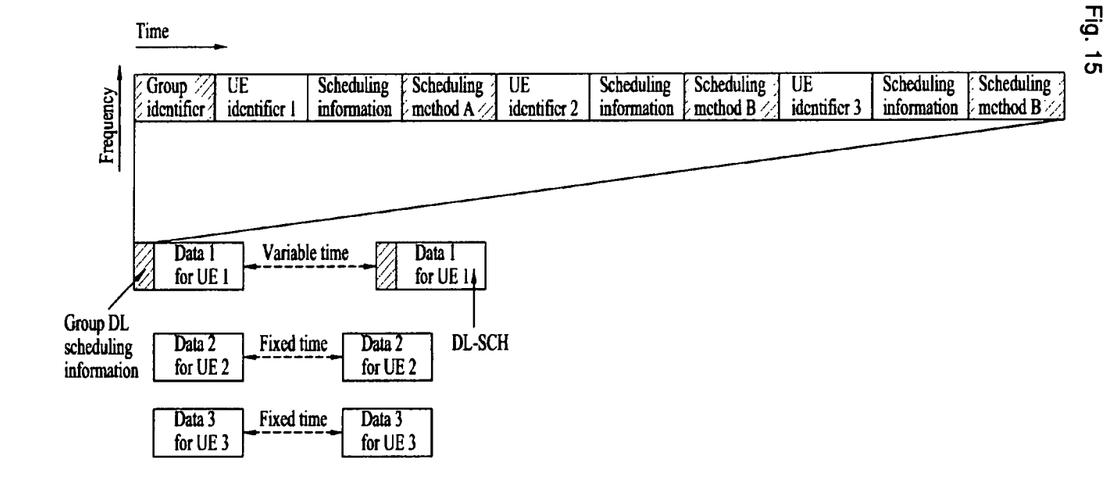
FIG. 15 is a view showing a process of determining a scheduling method using the additional field for group scheduling.

As shown in FIG. 15, the communication system supports two methods including the dynamic scheduling method (scheduling method A) and the synchronous HARQ retransmission method (scheduling method B), the group DL assignment includes a 1-bit additional field for specifying the scheduling methods of the UEs.

Each of the UEs receives the group DL assignment from the network, checks the scheduling method corresponding to its identifier, and receives user data according to the scheduling method. In the example shown in FIG. 15, the dynamic scheduling method (scheduling method A) is applied to the UE1 and the synchronous HARQ retransmission method (scheduling method B) is applied to the UE2 and the UE3.

Accordingly, if the retransmission is required after the UE1 receives specific data (Data 1) from the network, the UE1 checks the PDCCH and performs the retransmission through the DL assignment transmitted to only the UE1 or new group DL assignment. In contrast, if the UE2 and the UE3 retransmits the specific data (Data 1), the UE2 and the UE3 perform the retransmission using the parameter values of the preceding information which is previously received through the RRC signal or the group DL assignment which is used in the previous transmission, without separate DL assignment.

Although the transmission/reception of the downlink data is described in the embodiments of the present invention, the present invention is not limited thereto and the same method is applicable to the transmission/reception of uplink data.

Figure 16:
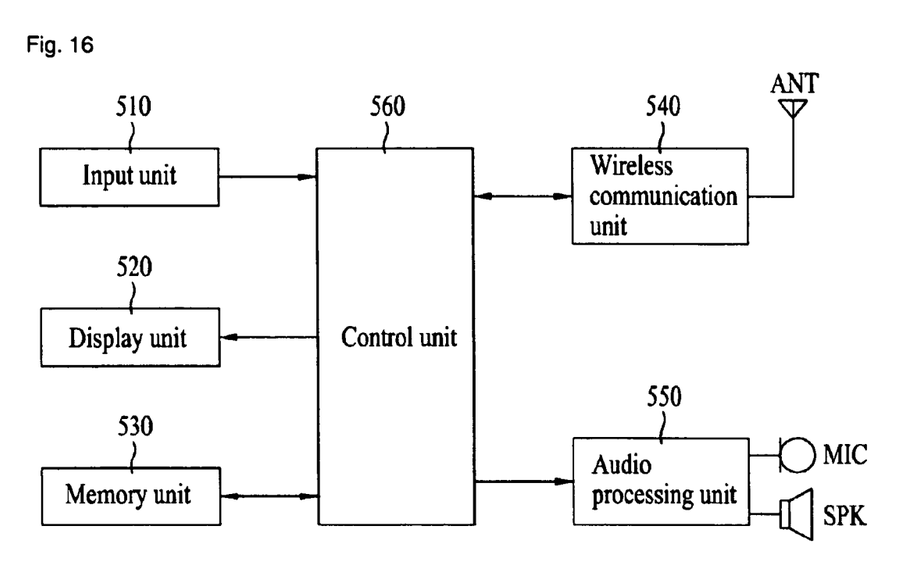
FIG. 16 is a block diagram showing the configuration of a mobile terminal according to an embodiment of the present invention.

FIG. 16 is a block diagram showing the configuration of a mobile terminal according to an embodiment of the present invention.

An input unit 510 selects a desired function or receives information. A display unit 520 displays a variety of information for operating the mobile terminal.

A memory unit 530 stores data to be transmitted to a reception side and various types of programs necessary for operating the mobile terminal. The memory unit 530 stores a mapping result between a HARQ process and a logical channel.

A wireless communication unit 540 receives an external signal and transmits data to the reception side. The wireless communication unit 540 can receive a control signal from a transmission side.

An audio processing unit 550 amplifies an audio signal from a microphone MIC and converts the amplified audio signal into a digital signal.

When the digital audio signal is converted into an analog audio signal and the analog audio signal is amplified, a speaker SP outputs the analog audio signal.

A control unit 560 controls the overall operation of the mobile terminal. In particular, the control unit 560 determines a HARQ process operation for receiving the data of the transmission side according to the result of mapping the HARQ process to the logical channel included in the control signal, when the wireless communication unit 540 receives the control signal from the transmission side.

When the result of mapping the HARQ process to the logical channel is stored in the memory unit 540 as an initial value, the control unit 560 reads the mapping result from the memory unit 540 and determines the HARQ process operation for receiving the data of the transmission side according to the read mapping result.

A control signal for specifying a specific scheduling method is received from the network through the wireless communication unit 540 and the scheduling process for receiving or transmitting the data according to the specific scheduling method is performed. Since the control unit 560 and the other components which are used for determining the specific scheduling method from the control signal received from the network and performing the transmission/reception of the data are described above, the detailed description thereof will be omitted.

As the mobile terminal of the present invention, a personal digital assistant (PDA), a cellular phone, a personal communication service (PCS) phone, a global system for mobile (GSM) phone, a wideband CDMA (WCDMA) phone, and a mobile broadband system (MBS) phone may be used.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

Industrial Applicability

The present invention relates to a HARQ process and more particularly to a method for transmitting data, which is capable of reducing unnecessary overhead and efficiently using a radio resource, and an apparatus related thereto. The present invention is applicable to apparatuses such as a terminal, a base station and a base station controller of a mobile communication system in hardware and is applicable to a control algorithm of the apparatuses in software.

The invention claimed is:

1. A method for transmitting data according to a hybrid automatic repeat request (HARQ) process at a transmitting side in a mobile communication system, the method comprising:
reserving one or more HARQ processes for a semi-static scheduling method; and
transmitting a control signal, based on a mapping of at least one HARQ process to at least one logical channel, to a reception side,
wherein information about the semi-static scheduling method is received via a radio resource control (RRC) signal,
wherein identifiers of the one or more HARQ processes are determined based on the information about the semi-static scheduling method.

2. The method according to claim 1, wherein the mapping comprises informing the reception side of a scheduling method corresponding to a type of the logical channel in advance.

3. The method according to claim 1, wherein an identifier of the at least one HARQ process identifies a scheduling method.

4. The method according to claim 1, wherein one or more identifiers of the reception side are reserved for the semi-static scheduling method,
wherein information about the one or more identifiers is received via the RRC signal.

5. The method according to claim 1, wherein, if the logical channel is a broadcast control channel (BCCH) carrying the control signal, a dedicated broadcast HARQ process is mapped to the BCCH.

6. A mobile communication terminal which receives data according to a hybrid automatic repeat request (HARQ) process in a mobile communication system, the mobile communication terminal comprising:
a wireless communication unit which receives a control signal, based on a mapping of at least one HARQ process to at least one logical channel, from a transmission side; and
a control unit which determines a HARQ process operation for receiving the data of the transmission side,
wherein one or more HARQ processes are reserved for a semi-static scheduling method,
wherein information about the semi-static scheduling method is received via a radio resource control (RRC) signal,
wherein identifiers of the one or more HARQ processes are determined based on the information about the semi-static scheduling method.

7. The mobile communication terminal according to claim 6, wherein the mapping result is obtained by mapping at least one HARQ process to at least one logical channel.

8. The mobile communication terminal according to claim 6, wherein an identifier of the at least one HARQ process identifies a scheduling method.

9. The mobile communication terminal according to claim 6, wherein one or more identifiers of the mobile communication terminal are reserved for the semi-static scheduling method,
wherein information about the one or more identifiers is received via the RRC signal.

10. The mobile communication terminal according to claim 6, wherein, if the logical channel is a broadcast control channel (BCCH) carrying the control signal, a dedicated broadcast HARQ process is mapped to the BCCH.

* * * * *